(12) United States Patent
Casanova

(10) Patent No.: US 11,788,410 B2
(45) Date of Patent: Oct. 17, 2023

(54) FLUID SEQUESTRATION METHOD AND SYSTEM

(71) Applicant: Gabriel Casanova, Spring, TX (US)

(72) Inventor: Gabriel Casanova, Spring, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/475,786

(22) Filed: Sep. 15, 2021

(65) Prior Publication Data

US 2023/0077558 A1 Mar. 16, 2023

(51) Int. Cl.
*E21B 49/08* (2006.01)
*E21B 33/10* (2006.01)
*E21B 34/14* (2006.01)

(52) U.S. Cl.
CPC .............. *E21B 49/08* (2013.01); *E21B 33/10* (2013.01); *E21B 34/14* (2013.01)

(58) Field of Classification Search
CPC .......... E21B 49/08; E21B 33/10; E21B 34/14; E21B 41/0042
See application file for complete search history.

(56) References Cited

U.S. PATENT DOCUMENTS

| | | | |
|---|---|---|---|
| 2,928,247 A | 3/1960 | Hubbell | |
| 2010/0000737 A1 | 1/2010 | Ramakrishnan et al. | |
| 2010/0116511 A1* | 5/2010 | Ramakrishnan | E21B 43/164 166/400 |
| 2012/0039668 A1 | 2/2012 | Park et al. | |
| 2015/0260038 A1* | 9/2015 | AlGouhi | E21B 34/14 166/264 |
| 2016/0298447 A1* | 10/2016 | Mohaghegh | E21B 41/0064 |
| 2021/0041410 A1 | 2/2021 | Muller et al. | |

FOREIGN PATENT DOCUMENTS

WO 2011032019 A2 3/2011

OTHER PUBLICATIONS

International Search Report and Written Opinion; PCT/US2022/076193; Korean Intellectual Property Office; dated Dec. 20, 2022; 11 pages.

* cited by examiner

*Primary Examiner* — Nicole Coy
*Assistant Examiner* — Nicholas D Wlodarski
(74) *Attorney, Agent, or Firm* — CANTOR COLBURN LLP

(57) ABSTRACT

A method for managing a sequestration fluid including sequestering a fluid in a subsurface formation downhole of a caprock and downhole of a seal in a borehole, targeting a sample of formation fluid in the borehole uphole of the caprock and uphole of the seal in the borehole. A sequestration system including a borehole in a formation, the borehole extending downhole of a caprock, a string disposed in the borehole, a seal between the string and a wall of the borehole uphole of the caprock, and a port in the string uphole of the seal and the caprock, the port having access to a portion of the formation uphole of the caprock.

14 Claims, 1 Drawing Sheet

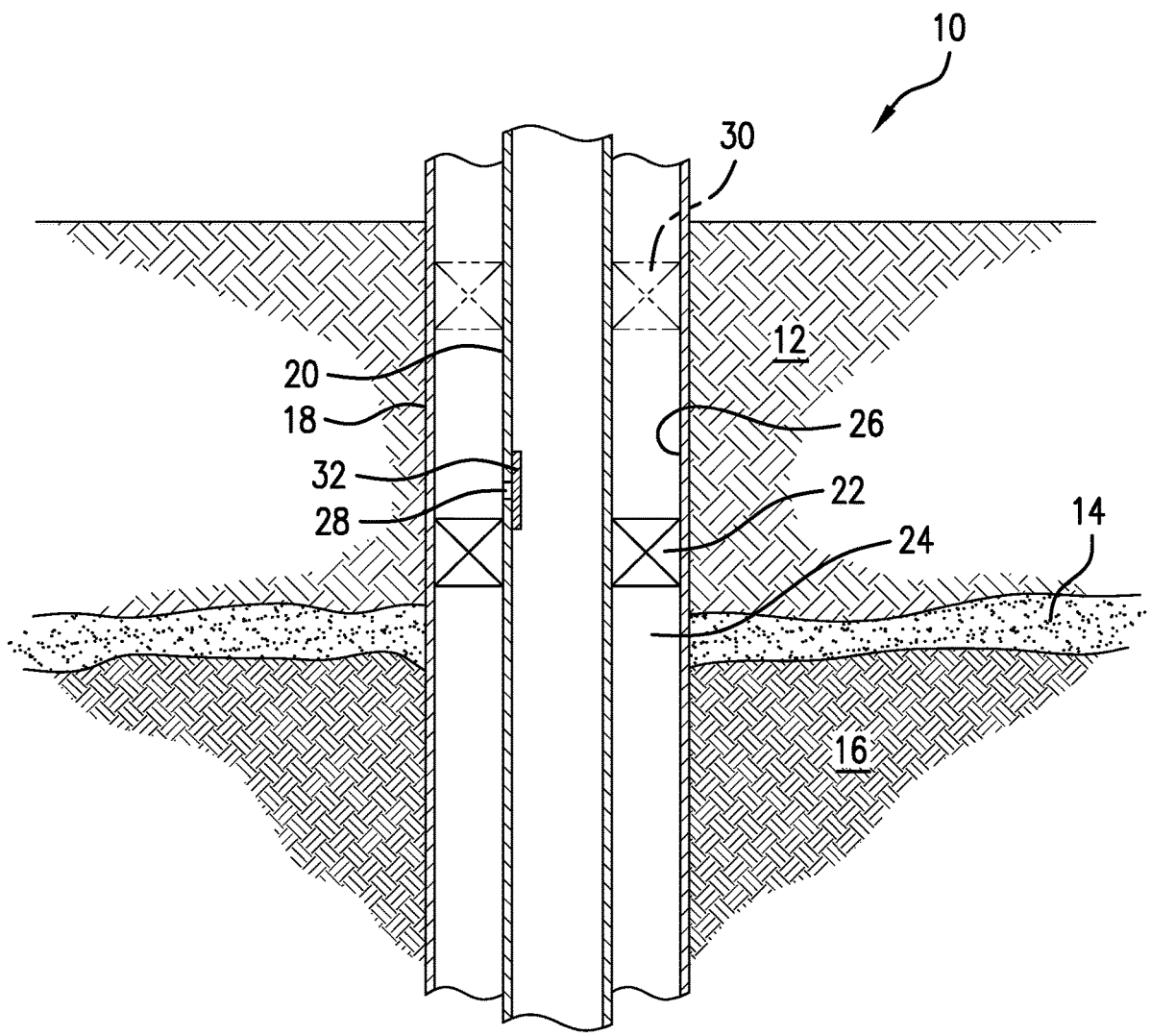

FLUID SEQUESTRATION METHOD AND SYSTEM

BACKGROUND

In the fluid sequestration industry, it is necessary to convey fluids to a subsurface sequestration reservoir and then to ensure that the fluid does not escape therefrom. Generally, that means testing the formation in which the reservoir is disposed above a caprock of the formation. This also means that a separate borehole must be drilled in the subsurface formation in order to test the formation for leaks of the sequestered fluid. The drilling of additional boreholes takes time and creates significant expense for an operator. The art would happily receive innovations that facilitate required testing while reducing cost and time to construct the sequestration system.

SUMMARY

An embodiment of a method for managing a sequestration fluid including sequestering a fluid in a subsurface formation downhole of a caprock and downhole of a seal in a borehole, targeting a sample of formation fluid in the borehole uphole of the caprock and uphole of the seal in the borehole.

An embodiment of a sequestration system including a borehole in a formation, the borehole extending downhole of a caprock, a string disposed in the borehole, a seal between the string and a wall of the borehole uphole of the caprock, and a port in the string uphole of the seal and the caprock, the port having access to a portion of the formation uphole of the caprock.

BRIEF DESCRIPTION OF THE DRAWINGS

The following descriptions should not be considered limiting in any way.

The FIGURE is a schematic view of a portion of a fluid sequestration system in a formation being used for fluid sequestration.

DETAILED DESCRIPTION

A detailed description of one or more embodiments of the disclosed apparatus and method are presented herein by way of exemplification and not limitation with reference to the FIGURE.

Referring to the FIGURE, a sequestration system 10 is illustrated. The system 10 includes a subsurface formation 12 having a caprock 14 and a reservoir 16 below (using gravity as a direction indicator) the caprock 14. A borehole 18 penetrates the subsurface formation 12 and the caprock 14 to access the reservoir 16, enabling fluid to be sequestered in the reservoir 16 through a string 20 (an example of a tubular structure) in the borehole 18. It will be appreciated that a seal 22, which may be any type of device or configuration that provides a sealing function such as cement or such as a packer, is disposed uphole of the caprock 14 in the borehole 18 to prevent any fluid from migrating uphole in the annular space 24 between the string 20 and a borehole wall 26. Disposed uphole of the seal 22 is a port 28. The port is configured to allow fluid from the formation 12 above the caprock 14 (collection site) to be drawn into the string 20 and thereby conveyed to a testing site. The testing site may be remote (e.g., surface location) from the collection site or may be local to the collection site in the event a downhole testing apparatus is employed. Such downhole apparatus may be obtained commercially. In either event, the collected fluid from the formation above the caprock 14 must be and remain free of the sequestered fluid to meet regulatory requirements. The testing may be continuous or may be periodic as dictated by local law. Important to perceive is that all testing is effected in the same borehole 18. No additional borehole is needed as is the case in the prior art. Accordingly, the cost and time to construct the sequestration system is substantially reduced over the prior art. Analysis screens for a legal maximum of the sequestered fluid, which may be as low as trace or even that the sequestered fluid is nonexistent in the target sample.

In an embodiment, a second seal 30 (such as a second packer, in broken lines to show optionality) may be set uphole of the port 28 in order to increase confidence that the fluid desired is the only fluid collected at port 28.

In the event the annulus 24 uphole of the packer 22 is to be cemented, then the port will be configured to ensure a pathway exists between the string 20 and the formation 12. That pathway may in an embodiment be a telescopic structure or otherwise providing that a fluid pathway does exist between the string 20 and the formation 12 that is not fully occluded by cement. As illustrated the pathway is simple in that it is merely an open annulus but it is easily ensured even if cemented with known methods.

In embodiments, it may be desirable to render the port 28 openable and closable. This would be beneficial in a system 10 where analysis of target fluid is not continuous. A valve 32 such as a sliding sleeve may be positioned to either close of or open the port 28. Opening and closing may be through mechanical intervention or may be via control line, etc. The valve also may be disposed in a tubing string or a casing string with the illustration appearing the same for either.

Fluid for sequestration may be injected in liquid or gaseous form and may comprise Carbon Dioxide, hydrogen, and other fluids that may need temporary or permanent sequestration.

Set forth below are some embodiments of the foregoing disclosure:

Embodiment 1: A method for managing a sequestration fluid including sequestering a fluid in a subsurface formation downhole of a caprock and downhole of a seal in a borehole, targeting a sample of formation fluid in the borehole uphole of the caprock and uphole of the seal in the borehole.

Embodiment 2: The method as claimed in claim 1 wherein the collecting is periodic.

Embodiment 3: The method as claimed in claim 1 further including opening a sample port in a tubular structure within the borehole.

Embodiment 4: The method as claimed in claim 3 further comprising collecting the target sample at a collection site.

Embodiment 5: The method as claimed in claim 3 further comprising setting a second seal uphole of the sample port prior to collecting the target sample.

Embodiment 6: The method as claimed in claim 3 further comprising creating a fluid pathway between the sample port and the subsurface formation.

Embodiment 7: The method as claimed in claim 6 including opening and/or closing the port.

Embodiment 8: The method as claimed in claim 7 wherein the opening and/or closing the pathway includes actuating a sliding sleeve.

Embodiment 9: The method as claimed in claim 8 wherein the sliding sleeve is in a casing string in the borehole.

Embodiment 10: The method as claimed in claim 8 wherein the sliding sleeve is in a tubing string in the borehole.

Embodiment 11: The method as claimed in claim 4 further comprising analyzing the target sample.

Embodiment 12: The method as claimed in claim 11 wherein the analyzing is conducted at or near the collection site.

Embodiment 13: The method as claimed in claim 3 further comprising running a sample collection tool into fluid communication with the sample port.

Embodiment 14: The method as claimed in claim 5 wherein the analyzing is conducted at a surface location.

Embodiment 15: The method as claimed in claim 3 further comprising closing the sample port.

Embodiment 16: The method as claimed in claim 5 wherein the analyzing is identifying trace amounts of the sequestered fluid.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method for managing a sequestration fluid comprising:
    sequestering a fluid in a subsurface formation downhole of a caprock and downhole of a seal in a borehole sealing between a string and the borehole wall;
    a sample port in the string uphole of the seal;
    a valve associated with the port, the valve being positionable to close or open the port;
        collecting a sample of formation fluid in the borehole uphole of the caprock and uphole of the seal in the borehole; and
    analyzing the fluid to identify the sequestered fluid.

2. The method as claimed in claim 1 wherein the collecting is periodic.

3. The method as claimed in claim 1 further including positioning the valve to open the sample port in the string.

4. The method as claimed in claim 3 further comprising setting a second seal uphole of the sample port prior to collecting the sample.

5. The method as claimed in claim 3 further comprising creating a fluid pathway between the sample port and the subsurface formation.

6. The method as claimed in claim 1 wherein the positioning of the valve is by sliding a sleeve of a sliding sleeve valve.

7. The method as claimed in claim 6 wherein the sliding sleeve is in a casing string in the borehole.

8. The method as claimed in claim 6 wherein the sliding sleeve is in a tubing string in the borehole.

9. The method as claimed in claim 1 wherein the analyzing is conducted at the collection site.

10. The method as claimed in claim 3 further comprising running a sample collection tool into fluid communication with the sample port.

11. The method as claimed in claim 1 wherein the analyzing is conducted at a surface location.

12. The method as claimed in claim 1 wherein the sequestering is by injecting.

13. The method as claimed in claim 12 wherein the injecting is injecting a liquid.

14. The method as claimed in claim 1 wherein the fluid is carbon dioxide.

* * * * *